United States Patent

[11] 3,599,512

[72] Inventor Robert W. Wayman
 Bloomfield Hills, Mich.
[21] Appl. No. 845,806
[22] Filed July 29, 1969
[45] Patented Aug. 17, 1971
[73] Assignee Borg-Warner Corporation
 Chicago, Ill.

[54] TRANSMISSION MECHANISM
 17 Claims, 3 Drawing Figs.
[52] U.S. Cl. .................................................. 74/763,
 192/85, 188/72.4, 74/801
[51] Int. Cl. ..................................................F16h 57/10,
 F16d 51/00, F16d 25/00
[50] Field of Search ..................................... 74/762,
 763; 192/85; 188/72.4

[56] References Cited
 UNITED STATES PATENTS
2,870,655   1/1959   Rockwell .................... 74/785
2,932,990   4/1960   Cartwright et al. ............ 74/763
3,263,526   8/1966   Stockton ..................... 74/759 X
3,318,174   5/1967   Clapp et al. .................. 74/763 X
3,475,992   11/1969  West, Jr. et al. .............. 74/759
2,509,784   5/1970   Mahoney ..................... 74/759 X Primary Examiner—Arthur T. McKeon
Attorneys—Donald W. Banner, William S. McCurry and John W. Butcher ABSTRACT: An automatic transmission structure of the planetary type including a planetary gear set providing a plurality of forward-driving ratios and a reverse-driving ratio and having remote means for applying a friction brake to establish one of the ratios, the remote means including an annular member extending from a hydraulic servomotor on one side of the planetary gear set to a friction brake mechanism on the other side of the planetary gear set so as to apply said friction brake remotely and further includes a sheet metal part interconnecting two elements of the planetary gear set and the output shaft of the transmission.

PATENTED AUG 17 1971 3,599,512

Inventor
Robert W. Wayman
By
Robert L. Zieg
atty.

3,599,512

TRANSMISSION MECHANISM

SUMMARY OF INVENTION

In automatic transmission structures, a common problem is the utilization of a common transmission case for more than one type of transmission to be included in the case. There has been provided a transmission for a particular type case for example which transmission provides four forward speeds and reverse between input and output shafts. The present invention solves one of the problems involved in that the servomotor used to apply one of the friction elements in the four-speed device is in a position at the rear of the case and the frictional element to be applied when the device is modified for a three-speed planetary gear set is on the opposite side of the planetary gear set. Therefore, a novel mechanism is employed to remotely apply the particular friction brake device disclosed herein.

In the present invention this difficulty has been solved by use of an annular tubular-shaped sheet metal force transmitting member which extends between a hydraulic servomotor on one side of the gear set and a friction engaging device on the opposite side of the gear set and thus provides that the friction engaging mechanism may be engaged from a remote position in the transmission. In addition, the force-transmitting means is made of sheet metal which may be conveniently manufactured from a tube or by rolling sheet metal into the form of a tube and securing the sheet metal part to a hydraulic piston in the servomotor.

Further, the present invention provides an interconnecting element for the gear set made of sheet metal which has a central radial portion connected to one element of the gear set, a forwardly extending axial portion connected to another element of the gear set and a rearwardly extending axial portion connected to the output shaft of the transmission. The interconnecting element may be conveniently, for example, welded to the two elements of the planetary gear set and by slotted connection connected to the output shaft of the transmission mechanism.

DESCRIPTION OF THE DRAWINGS

Referring to FIG. 1, a transmission mechanism 10 is schematically illustrated. This transmission includes a transmission casing 11, an input shaft 12 and an output shaft 13. Rotatably fixed in the case 11 is a stationary sleeve 15 which has incorporated therein several of the friction engaging mechanisms for the transmission mechanism. Also provided in the transmission case 11 is a pair of clutches 20 and 21, friction brake mechanisms 23, 24 and 25 and a planetary gear set 27. An intermediate shaft 30 interconnects clutch 20 with an annulus gear 31 in the gear set, an intermediate shaft 34 interconnects clutch 21 with a double sun gear arrangement 36 for the gear set 27. The planetary gear set 27 further includes a planetary gear carrier 38 having planetary pinions 39 journaled thereon and a planetary carrier 40 having planetary pinions 42 journaled thereon. The planetary pinions 42 mesh with the annulus gear 31 and the sun gear 36. There is further provided an annulus gear 44 meshing with planetary pinions 39.

Figure 1:
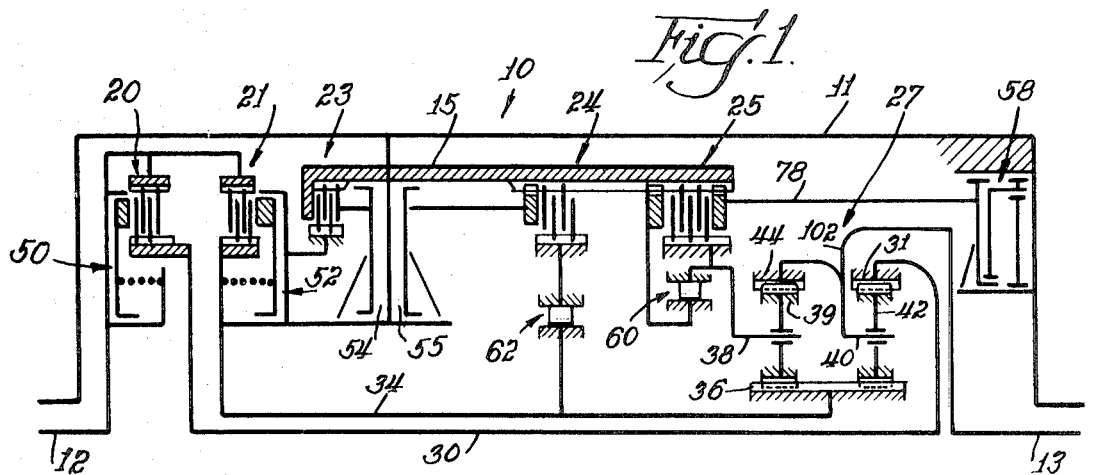
FIG. 1 represents a schematic view of the transmission mechanism with which the present invention is used.

A hydraulic servomotor 50 is provided for clutch 20 and a hydraulic servomotor 52 is provided for clutch 21. A hydraulic servomotor 54 is provided for friction brake 23 and a hydraulic servomotor 55 is provided for friction brake 24. A hydraulic servomotor 58 is provided at the rear of the transmission case 11 for the friction engaging mechanism 25. A one-way brake 60 is provided for the planetary carrier 38, a one-way brake 62 is provided between friction brake 24 and intermediate shaft 34.

Operation of the transmission mechanism as described above and relating to the schematic showing in FIG. 1 is as follows: with clutches 20 and 21 disengaged a neutral condition is established.

Low or first drive ratio is established by application of clutch 20 connecting shaft 30 with input shaft 12 thereby driving annulus gear 31 in the forward direction. The planetary carrier 40 is connected to output shaft 13 thereby providing a forward drive of the output shaft 13 at a reduced speed, one-way brake 60 holding planetary carrier 38 to provide a reaction element for the planetary gear set. A manual first speed drive ratio similar to the one-way drive just described may be provided by engagement of friction brake 25 by means of hydraulic servomotor 58 holding planetary carrier 38 against rotation in either direction thereby establishing a two-way drive through the planetary gear set.

Second drive ratio is provided by clutch 20 remaining engaged and engagement of friction brake 24 by hydraulic servomotor 55 thus holding the sun gears 36 stationary. Under these conditions a higher speed forward drive is provided by the planetary carrier 40 being driven by input shaft 12 at a reduced speed with one-way brake 62 being made effective to hold sun gears 36 stationary establishing a one-way drive connection for second speed. Optionally brake 23 may be applied to hold shaft 34 against rotation in either direction to provide a two-way second speed drive ratio.

Third speed drive ratio is provided by clutch 20 remaining engaged and clutch 21 being engaged by hydraulic servomotor 52 thereby locking shafts 34 and 30 together locking up the planetary gear set and providing a 1:1 forward drive of the output shaft 13.

Reverse drive ratio is established by engagement of clutch 21 and engagement of friction brake 25 the sun gear 36 thus being driven en a forward direction planetary carrier 38 being held stationary and thus driving annulus gear 44 and thereby output shaft 13 in the reverse direction.

Figure 2:
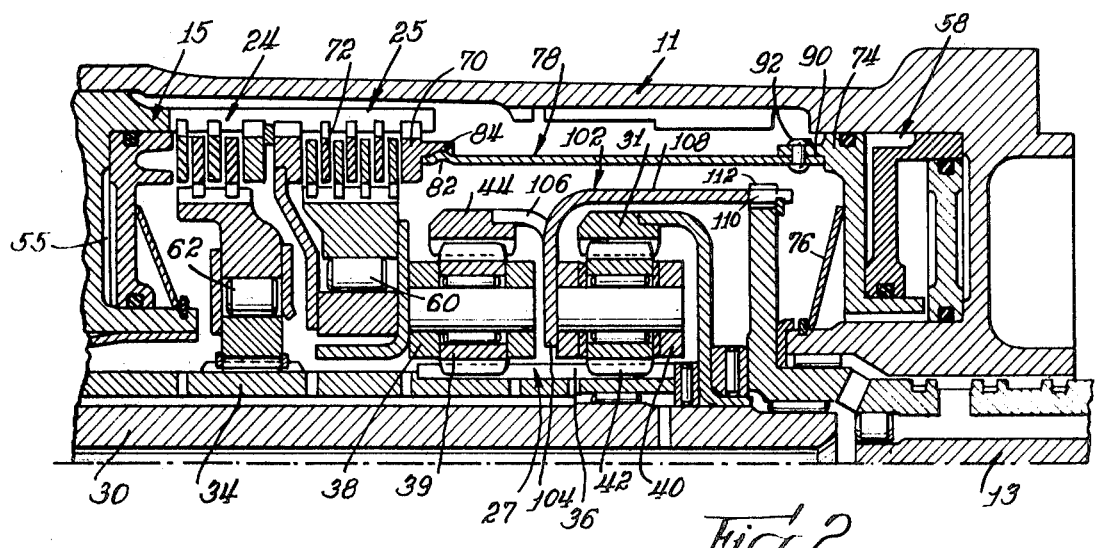
FIG. 2 is a cross-sectional view in detail of part of the transmission mechanism.

Referring specifically to FIG. 2, a novel and improved structure for accomplishing the operation of the above-described transmission mechanism is illustrated in detail. Friction brake 25 has included therewith an apply plate or member 70 which is splined to sleeve 15 and is axially slidable to engage the friction engaging plates 72 of the friction brake 25. Provided in the hydraulic servomotor 58 is an axially slidable member or piston 74 which is movable in response to fluid pressure against the force of a return spring 76 to move apply plate 70 to engage friction brake 25. An annular thrust-transmitting member 78 is provided to provide a connection between piston 74 and apply plate 70. As discussed, the hydraulic servomotor 58 and piston 74 is disposed on one side of gear set 27 and the friction brake mechanism 25 is disposed on the opposite side of the planetary gear set 27. Thus the friction brake 25 is remotely applied by means of annular member 78 extending over the planetary gear set 27 between piston 74 and apply plate 70.

The member 78 is conveniently formed in an annular tubelike shape of sheet metal which may be manufactured from a tube or by rolling a piece of sheet metal to the desired shape. A projection 82 is provided in the member 78 which is received in a mating recess 84 in plate 70. The member 78 is mounted within a bore 90 in piston 74 and may be secured thereto by any known means, as for example, by rivets 92.

Figure 3:
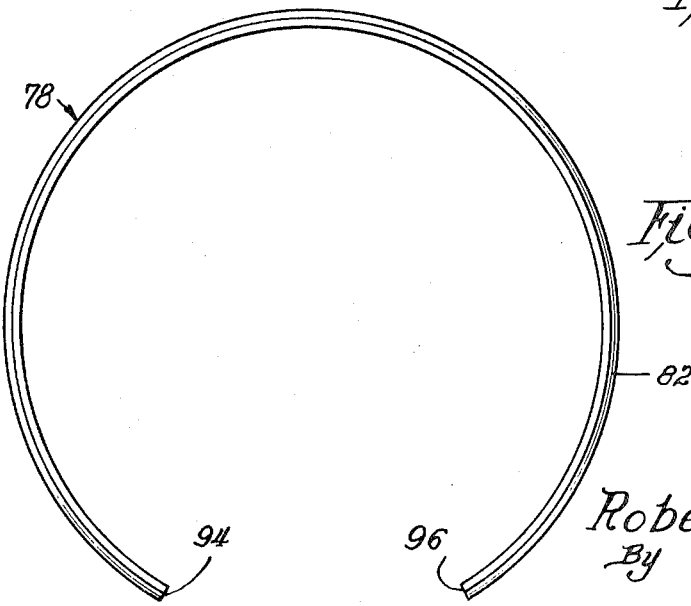
FIG. 3 is an end view of the annular force-transmitting member shown in FIG. 2.

Referring to FIG. 3, an interruption in the circumference of member 78 is provided resulting in terminal end portions 94 and 96 of the annular member 78. This interruption is provided to allow access of the parking brake mechanism (not illustrated) to the planetary gear set.

A further improvement is provided in the present invention by utilization of a sheet metal torque-transmitting member 102 in the transmission combination which interconnects planetary carrier 40, annulus gear 44, and output shaft 13. The torque-transmitting member 102 has a central radially extending portion 104, a forwardly extending axial portion 106 and a rearwardly extending axial portion 108. Slots 110 are provided in the axial portion 18 of torque-transmitting member 102 for engagement by teeth 112 on output shaft 13. The sheet metal torque-transmitting member 102 is formed by drawing an annular sheet metal member such as to form a shape having portions 108 and 104 and then partially severing portions 106 at spaced locations around the periphery of portions 108 from the part in the area of the juncture of portions 104 and 108 and then bending the portions 106 to their forwardly extending disposition as shown in FIG. 2. The central radial portion 104 may be joined to the planetary carrier 40 by an known means, which may be, for example, by welding, and in particular an electron beam welding process. Portion 106 may be joined to annulus gear 44 in any known manner, as for example, by welding, and in particular an electron beam welding process.

As will be apparent from the above description, there has been provided a transmission that conveniently uses a sheet metal member to transmit torque from either of two elements of the planetary gear set to the output shaft and further, the transmission may utilize a transmission case 11 which has a servomotor 58 at one end thereof to apply remotely a friction brake mechanism. The transmission case 11, being normally used for a transmission having an additional gear set and wherein the servomotor 58 is adjacent a friction engaging device, may be used with the gear set construction shown and described herein due to the utilization of the novel and improved brake mechanism including the annular thrust-transmitting member 78 permitting remote operation of brake mechanism 25 by servomotor 58 in its rearward location axially displaced from brake mechanism 25.

Various features of the invention have been particularly shown and described; however, it should be obvious to one skilled in the art that modifications may be made therein without departing from the scope of the invention.

I claim:

1. A mechanism for transmitting axial thrust including a first member having thrust imparted thereto and a second member axially displaced from said first member and said second member receiving axial thrust from said first member, comprising means interconnecting said members, said means comprising an axially extending annular sheet metal member secured to said first member and means securing said annular member to said second member whereby axial thrust applied to said first member will be transmitted to said second member.

2. A device as claimed in claim 1 wherein said annular member is received within a counterbore in said first member said means securing comprising a projection formed in said annular member to retain said annular member in said second member.

3. A device as claimed in claim 1 wherein said annular member includes an interruption in the circumference thereof to provide an access opening through said annular member.

4. In a transmission mechanism including a fluid-actuated servomotor and a friction engaging mechanism, said servomotor and said friction engaging mechanism being axially displaced, an axially slidable member in said servomotor movably axially in response to fluid pressure, an axially movable apply member in said friction engaging mechanism, an annular member connected between said slidable member and said apply member so as to establish a thrust-transmitting relationship between same, and said annular member having a tubelike shape and being formed from sheet metal.

5. A device as claimed in claim 4 wherein said annular member is received within a bore in said axially slidable member.

6. A device as claimed in claim 5 including means formed on said annular member retaining said apply member thereon.

7. A device as claimed in claim 4 wherein said transmission mechanism includes a gear set and said servomotor is disposed on one side of said gear set and said friction device is disposed on the other side of said gear set, said annular member establishing a thrust-transmitting relationship between the axially slidable member and said apply member.

8. A transmission mechanism including a planetary gear set having a plurality of intermeshing elements and further including a plurality of friction engaging devices engageable to establish a plurality of gear ratios through said transmission, one of said friction engaging devices being disposed adjacent said planetary gear set, a hydraulic mechanism for applying said friction engaging mechanism being disposed on the opposite side of said gear set, said hydraulic mechanism including an axially slidable piston responsive to fluid pressure to be moved axially, said friction engaging mechanism including an apply member movable axially to engage the friction engaging mechanism, annular means interconnecting said piston and said apply member of said friction engaging mechanism, said annular means extending axially over the length of said planetary gear set, said annular means being of sheet metal and establishing a thrust-transmitting relationship between said piston and said apply member whereby said friction engaging device can be engaged from a remote location in said transmission mechanism.

9. A transmission as claimed in claim 8 wherein said annular means is received within a bore in said piston and including means securing said annular means to said piston.

10. A device as claimed in claim 9 further including means securing said apply member to said annular means.

11. A device as claimed in claim 9 wherein said annular means has an interrupted portion in the circumference thereof to provide access means between the outer side of said annular member and said gear set.

12. A device as claimed in claim 8 wherein said transmission includes friction engaging devices engageable to connect first or second elements of said gear set to a power source and said friction engaging mechanism adjacent said gear set comprising means to hold an element of said gear set stationary to establish a particular ratio in said planetary gear set.

13. A device as claimed in claim 12 wherein there is provided a one-way brake mechanism for said element of said gear set to be held stationary by said friction brake mechanism adjacent said gear set whereby said element is held stationary against rotation in one direction by said one-way brake and is held stationary in both directions by said friction engaging mechanism.

14. A transmission mechanism including a planetary gear set having a plurality of intermeshing elements and an output shaft and further including a plurality of friction engaging devices engageable to establish a plurality of gear ratios through said transmission, one of said friction engaging devices being disposed adjacent said planetary gear set, a hydraulic mechanism for applying said friction engaging mechanism being disposed on the opposite side of said gear set, said hydraulic mechanism including an axially slidable piston responsive to fluid pressure to be moved axially, said friction engaging mechanism including an apply member movable axially to engage the friction engaging mechanism, annular means interconnecting said piston and said apply member of said friction engaging mechanism, said annular means extending axially over the length of said planetary gear set, said annular means being of sheet metal and establishing a thrust-transmitting relationship between said piston and said apply member whereby said friction engaging device can be engaged from a remote location in said transmission mechanism, and said planetary gear set including a torque-transmitting member connected to at least two of said gear set elements and to said output shaft, said torque-transmitting member being formed of sheet metal and having a central radial portion and forwardly and rearwardly extending axial portions.

15. A transmission mechanism as claimed in claim 14 wherein said forwardly extending axial portion of said torque transmitting member is connected to one of said gear set elements and said central radial portion is connected to another element of said gear set.

16. A transmission mechanism as claimed in claim 14 wherein said forwardly extending portion of said torque-transmitting member is defined by partially severed sections of said rearwardly extending portion, which are bent to extend forwardly.

17. A transmission mechanism as claimed in claim 14 wherein said rearwardly extending portion of said torque-transmitting member has means formed therein for connection to said output shaft.